(12) United States Patent
Nikolskiy et al.

(10) Patent No.: US 11,931,213 B2
(45) Date of Patent: Mar. 19, 2024

(54) SEMI-AUTOMATIC SYSTEM AND METHOD USING BOUNDARY LOOP SEGMENTS FOR SEGMENTING TEETH

(71) Applicant: James R. Glidewell Dental Ceramics, Inc., Newport Beach, CA (US)

(72) Inventors: Sergey Nikolskiy, Coto de Caza, CA (US); Fedor Chelnokov, Khimki (RU)

(73) Assignee: James R. Glidewell Dental Ceramics, Inc., Newport Beach, CA (US)

( * ) Notice: Subject to any disclaimer, the term of this patent is extended or adjusted under 35 U.S.C. 154(b) by 527 days.

(21) Appl. No.: 16/778,406

(22) Filed: Jan. 31, 2020

(65) Prior Publication Data

US 2021/0236249 A1    Aug. 5, 2021

(51) Int. Cl.
*A61C 13/00* (2006.01)
*G06T 7/11* (2017.01)

(52) U.S. Cl.
CPC ............ *A61C 13/0004* (2013.01); *G06T 7/11* (2017.01); *G06T 2207/30036* (2013.01)

(58) Field of Classification Search
None
See application file for complete search history.

(56) References Cited

U.S. PATENT DOCUMENTS

| | | | |
|---|---|---|---|
| 6,616,444 B2 | 9/2003 | Andreiko et al. | |
| 7,744,369 B2 | 6/2010 | Imgrund et al. | |
| 8,512,037 B2 | 8/2013 | Andreiko | |
| 9,844,419 B2 | 12/2017 | Andreiko | |
| 10,368,961 B2 | 8/2019 | Paehl et al. | |
| 10,383,704 B2 | 8/2019 | Kitching | |
| 2004/0096799 A1* | 5/2004 | Hughes | A61C 7/00 700/98 |
| 2006/0028466 A1* | 2/2006 | Zhou | G06T 17/205 345/420 |
| 2006/0147872 A1 | 7/2006 | Andreiko | |
| 2013/0022255 A1 | 1/2013 | Chen et al. | |
| 2013/0095446 A1 | 4/2013 | Andreiko et al. | |
| 2013/0122448 A1 | 5/2013 | Kitching | |
| 2014/0067335 A1 | 3/2014 | Andreiko | |
| 2017/0007365 A1 | 1/2017 | Kopelman et al. | |
| 2017/0281110 A1 | 10/2017 | Mandelkern et al. | |
| 2018/0028063 A1 | 2/2018 | Elbaz et al. | |
| 2018/0028064 A1 | 2/2018 | Elbaz et al. | |
| 2018/0028065 A1 | 2/2018 | Elbaz et al. | |
| 2018/0078336 A1 | 3/2018 | Andreiko | |

(Continued)

FOREIGN PATENT DOCUMENTS

| | | | |
|---|---|---|---|
| EP | 2754407 A1 | 7/2014 | |
| EP | 3578131 A1 | 12/2019 | |

(Continued)

OTHER PUBLICATIONS

Zadeh H. H., 'Minimally Invasive Treatment of Maxillary Anterior Gingival Recession Defects by Vestibular Incision Subperiosteal Tunnel Access and Platelet-Derived Growth Factor BB', The International Journal of Periodontics & Restorative Dentistry, 31(6), pp. 3-9. (Year: 2011).*

(Continued)

*Primary Examiner* — Patrick F Valdez
(74) *Attorney, Agent, or Firm* — Charles Fowler

(57) ABSTRACT

A method and system provide segmenting a digital tooth in a 3D digital model of dentition.

23 Claims, 17 Drawing Sheets

(56) References Cited

U.S. PATENT DOCUMENTS

| | | | |
|---|---|---|---|
| 2018/0085203 A1* | 3/2018 | Ramirez | G06F 30/00 |
| 2018/0132982 A1 | 5/2018 | Nikolskiy et al. | |
| 2018/0360567 A1 | 12/2018 | Xue et al. | |
| 2019/0000593 A1 | 1/2019 | Cam et al. | |
| 2019/0076026 A1 | 3/2019 | Elbaz et al. | |
| 2019/0095539 A1 | 3/2019 | Elbaz et al. | |
| 2019/0125497 A1 | 5/2019 | Derakhshan et al. | |
| 2019/0150724 A1 | 5/2019 | Elazer et al. | |
| 2019/0152152 A1 | 5/2019 | O'Leary et al. | |
| 2019/0321136 A1 | 10/2019 | Martz et al. | |
| 2020/0306012 A1* | 10/2020 | Roschin | G06F 30/10 |
| 2020/0405464 A1 | 12/2020 | Nikolskiy et al. | |

FOREIGN PATENT DOCUMENTS

| | | |
|---|---|---|
| WO | 2004028391 A2 | 4/2004 |
| WO | 2016044465 A1 | 3/2016 |
| WO | 2017006179 A1 | 1/2017 |
| WO | 2018005501 A9 | 1/2018 |
| WO | 2018022940 A1 | 2/2018 |
| WO | 2018106527 A2 | 6/2018 |
| WO | 2019006386 A1 | 1/2019 |
| WO | 2019069162 A1 | 4/2019 |
| WO | 2019089782 A1 | 5/2019 |
| WO | 2019100022 A1 | 5/2019 |

OTHER PUBLICATIONS

Sheng-Hui Liao et al., Automatic Tooth Segmentation of Dental Mesh Based on Harmonic Fields, Article in BioMed Research International—Aug. 2015, Hindawai Publishing Corporation, Article ID 187173, in 11 pages.

Yu-Bing Chang et al., An Automatic and Robust Algorithm of Reestablishment of Digital Dental Occlusion, IEEE Transactions on Medical Imaging, vol. 29, No. 9, Sep. 2010, in 12 pages.

Wikipedia.org, Breadth—First search, downloaded on Jan. 16, 2020, in 6 pages.

Wikipedia.org, Depth—First search, downloaded on Jan. 16, 2020, in 7 pages.

Yuri Boykov et al., An Experimental Comparison of Min-Cut/Max-Flow Algorithms for Energy Minimization in Vision, in IEEE Transactions on PAMI, vol. 26, No. 9, pp. 1124-1137, Sep. 2004.

Shuai Yang et al., 3D Intelligent Scissors for Dental Mesh Segmentation, Hindawi, Computututational and Mathematical Methods in Medicine, vol. 2020, Article ID 1394231, 12 pages.

Toshiaki Kondo et al., Tooth Segmentation of Dental Study Models Using Range Images, Article in IEEE Transactions on Medical Imaging—Apr. 2004 in 14 pages.

Shuai Yang et al., Interactive Tooth Segmentation Method of Dental Modes based on Geodesic, Jan. 2017, in 6 pages.

Stephan Diederich, boykov_kolmogorov_max_flow, Boost C++ Libraries, obtained online from https://www.boost.org/doc/libs/1_72_0/libs/graph/doc/boykov_kolmogorov_max_flow.html, Copyright 2006, in 5 pages.

T. Rabbani et al., Segmentation of Point Clouds Using Smoothness Constraint, ISPRS Commission B Symposium Image Engineering, IAPRS vol. XXXVI, Part 5, Dresden 25-27, Sep. 2006, p. 248-253.

* cited by examiner

SEMI-AUTOMATIC SYSTEM AND METHOD USING BOUNDARY LOOP SEGMENTS FOR SEGMENTING TEETH

BACKGROUND

Specialized dental laboratories typically use computer-aided design (CAD) and computer-aided manufacturing (CAM) milling systems to manufacture dental prostheses based on patient-specific instructions provided by dentists. In a typical work flow, the dental laboratories receive information about a patient's oral situation from a dentist. Using this information, the dental laboratory designs a dental prosthesis on the CAD system and manufactures the prosthesis on the CAM system with a mill or other fabrication system. To use the CAD/CAM system, a digital model of the patient's dentition can be used as an input to the process. Given a digital surface of j aw or a portion of a jaw containing gum and some teeth, it can be desirable to segment one particular tooth from the gum and remaining teeth. However, segmentation in fully automatic mode can be challenging due to variation in tooth shapes, location of teeth far from a dental arch (e.g. ectopic teeth), and the desire to make a segment boundary precise. Segmentation in fully manual mode can be tedious and time-consuming, as well as introduce errors. Partly manual segmentation can typically require a user to select a few points on a facial side or occlusal side only. This can cause segmentation errors, particularly on the facial side (far from the input points), especially if the gum-tooth boundary is not very pronounced.

SUMMARY

Disclosed is a computer-implemented method of segmenting a digital tooth in a 3D digital model of dentition. The method can include: receiving a facial region and a lingual region of a digital tooth in a digital model, determining a separation region oriented through the facial region and the lingual region, determining a first segment path along the digital tooth on a first side of the separation region, and determining a second segment path along the digital tooth on a second side of the separation region.

Disclosed is a method of segmenting a digital tooth in a 3D digital model of dentition. The method can include: selecting a facial region and a lingual region of a digital tooth in a digital model, and initiating segmentation of the digital tooth.

Also disclosed is a system for segmenting a digital tooth in a 3D digital model of dentition. The system can include: a processor; a computer-readable storage medium comprising instructions executable by the processor to perform steps comprising: receiving a facial region and a lingual region of a digital tooth in a digital model, determining a separation region oriented through the facial region and the lingual region, determining a first segment path along the digital tooth on a first side of the separation region, and determining a second segment path along the digital tooth on a second side of the separation region.

DETAILED DESCRIPTION

Figure 1A:
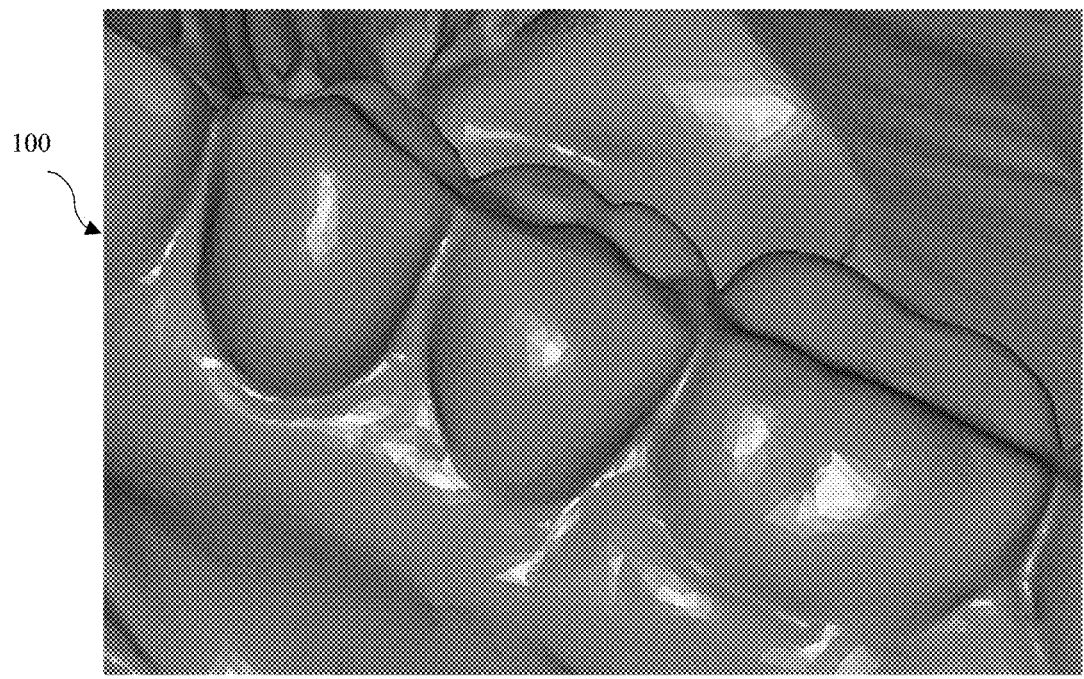
FIG. 1(A) is a perspective view of a digital model.

For purposes of this description, certain aspects, advantages, and novel features of the embodiments of this disclosure are described herein. The disclosed methods, apparatus, and systems should not be construed as being limiting in any way. Instead, the present disclosure is directed toward all novel and nonobvious features and aspects of the various disclosed embodiments, alone and in various combinations and sub-combinations with one another. The methods, apparatus, and systems are not limited to any specific aspect or feature or combination thereof, nor do the disclosed embodiments require that any one or more specific advantages be present or problems be solved.

Although the operations of some of the disclosed embodiments are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "provide" or "achieve" to describe the disclosed methods. The actual operations that correspond to these terms may vary depending on the particular implementation and are readily discernible by one of ordinary skill in the art.

As used in this application and in the claims, the singular forms "a," "an," and "the" include the plural forms unless the context clearly dictates otherwise. Additionally, the term "includes" means "comprises." Further, the terms "coupled" and "associated" generally mean electrically, electromagnetically, and/or physically (e.g., mechanically or chemically) coupled or linked and does not exclude the presence of intermediate elements between the coupled or associated items absent specific contrary language.

In some examples, values, procedures, or apparatus may be referred to as "lowest," "best," "minimum," or the like. It will be appreciated that such descriptions are intended to indicate that a selection among many alternatives can be made, and such selections need not be better, smaller, or otherwise preferable to other selections.

In the following description, certain terms may be used such as "up," "down," "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object.

"Facial" refers to the side of a tooth—whether an anterior tooth or a posterior tooth—that is adjacent to or in the direction toward the inside of the cheeks and lips. It is opposed to the lingual or palatal (oral) side, which refers to the side of a tooth—whether an anterior tooth or a posterior tooth—adjacent to or in the direction toward the tongue or palate, respectively.

Disclosed is a computer-implemented method of segmenting a digital tooth in a 3D digital model of dentition. The method can include: receiving a facial region and a lingual region of a digital tooth in a digital model; determining a separation region oriented through the facial region and the lingual region; determining a first segment path along the digital tooth on a first side of the separation region; and determining a second segment path along the digital tooth on a second side of the separation region. In some embodiments, the separation region can also optionally be oriented along an occlusal direction. In some embodiments, the separation region can be oriented through a facial point in the facial region and a lingual point in the lingual region, for example.

FIG. 1(A) illustrates one example of a digital model 100 that can be generated by scanning a physical impression using any scanning technique known in the art including, but not limited to, for example, optical scanning, CT scanning, etc. The digital model 100 can also be generated by intraoral scanning of the patient's dentition, for example. One example is described in U.S. Patent Application No. US20180132982A1 to Nikolskiy et al., which is hereby incorporated in its entirety by reference. In some embodiments, the scanning process can produce STL, PLY, or CTM files, for example. A conventional scanner typically captures the shape of the physical impression/patient's dentition in 3 dimensions during a scan and digitizes the shape into a 3 dimensional digital model. The digital model can include multiple interconnected polygons in a topology that corresponds to the shape of the physical impression/patient's dentition, for example. In some embodiments, the polygons can include two or more digital triangles.

Figure 1B:
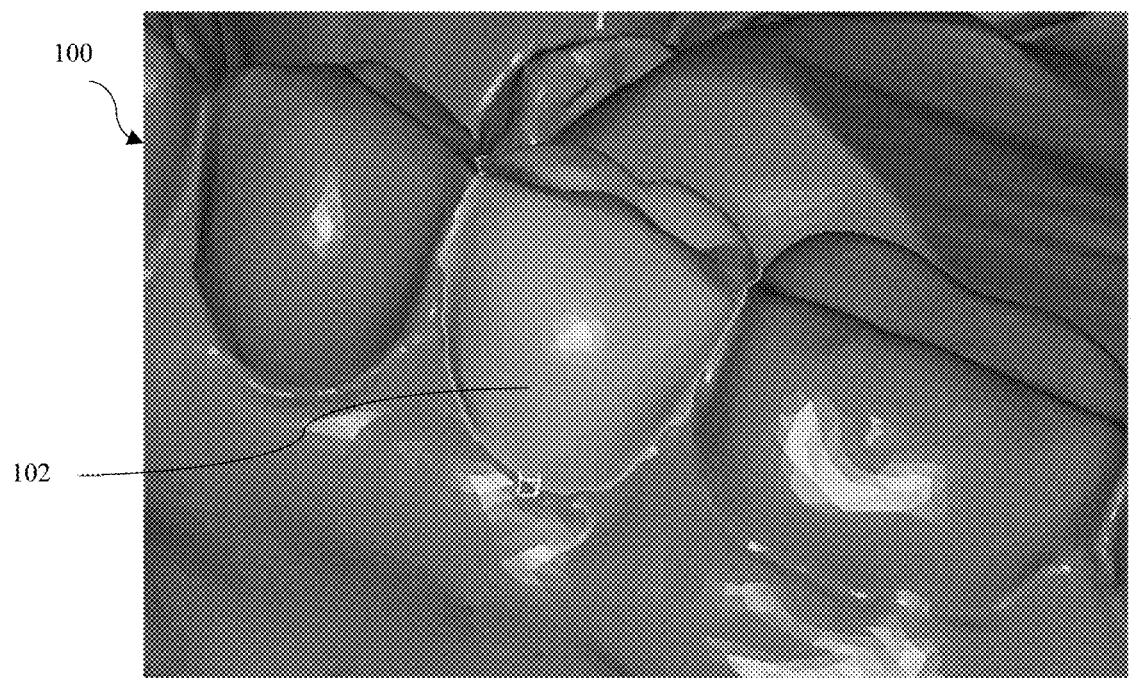
FIG. 1(B) is a perspective view of a digital model with a digital tooth.

Some embodiments can include a computer-implemented method of segmenting a digital tooth in a 3D digital model, such as the digital tooth 102 in the 3D digital model 100 illustrated in FIG. 1(B), for example.

In some embodiments, the computer-implemented method of segmenting the digital tooth in the 3D digital model of dentition can include receiving a digital model, a facial region, and a lingual region of a digital tooth in the digital model. In some embodiments, the facial region can be a single facial point. In some embodiments, the lingual region can be a single lingual point. In some embodiments, the facial region can include a facial digital surface that can include many points. In some embodiments, the lingual region can include a lingual digital surface that can include many points. In some embodiments, the computer-implemented method can determine any point in the facial region as a facial point, and any point in the lingual region as the lingual point, for example. In some embodiments, the computer-implemented method can determine a facial point as a facial region center point. In some embodiments, the computer-implemented method can determine a lingual point as a lingual region center point. The computer-implemented method can determine the facial region center point in some embodiments by determining a center of gravity of the facial region digital surface, for example. The computer-implemented method can determine the lingual region center point in some embodiments by determining a center of gravity of the lingual region digital surface, for example. The center of gravity for the facial region and the lingual region can be determined as follows for each region: (1) compute D=sum of triangle's area for all digital surface triangles, where D is a scalar value (2) compute N=sum of (triangle's area*triangle's center) for all digital surface triangles, where N is a vector (3) The center of gravity point=N/D. The center of gravity point can be projected back to the closest point on the digital surface, for example. This can be used by the computer-implemented method to determine the facial point and the lingual point as center points of the facial and lingual regions, respectively.

Figure 2A:
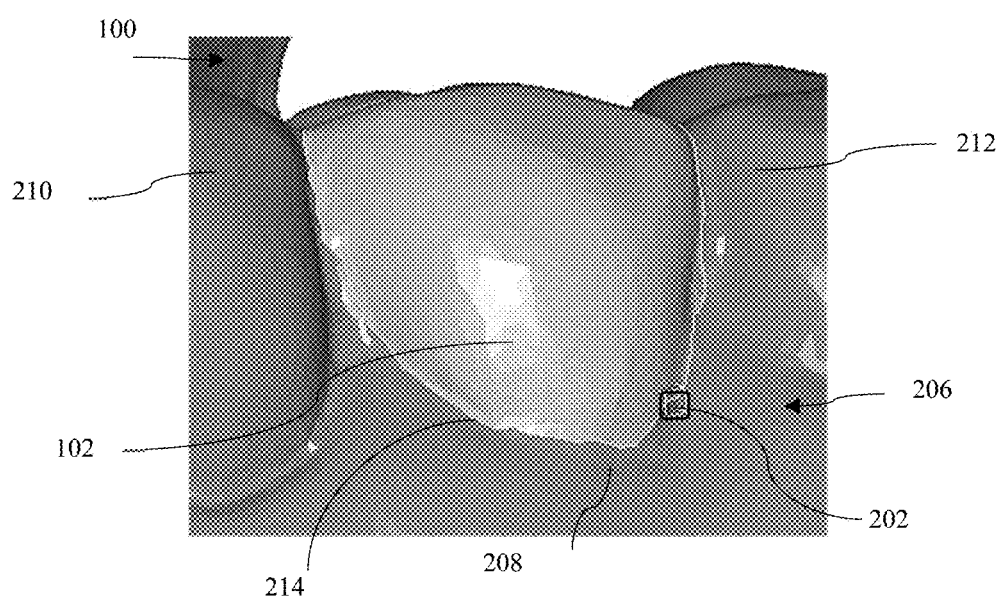
FIG. 2(A) is a perspective view of a digital tooth and a facial point.

FIG. 2(A) illustrates an embodiment that includes a facial point 202 for the digital tooth 102 in the digital model 100. The facial point 202 can be any point on the facial side 206 of the digital tooth 102 along a facial boundary region 214 between the digital tooth 102 and a digital gum line 208 and/or neighboring digital teeth 210 and 212 on the facial side 206 in some embodiments, for example. The facial side 206 can be, for example, on the side of the digital tooth 102 nearest a cheek region, for example.

Figure 2B:
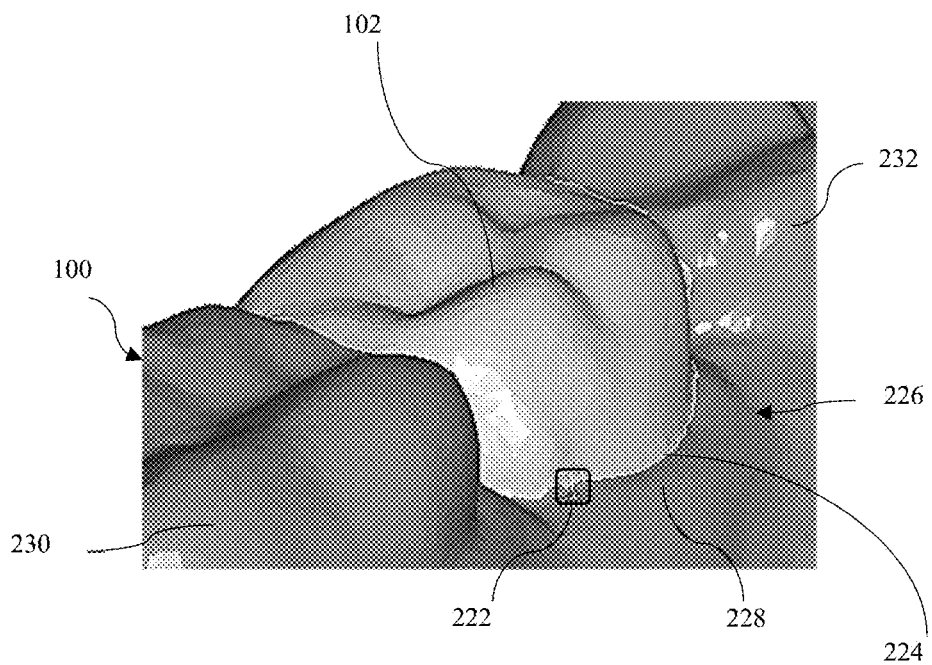
FIG. 2(B) is a perspective view of a digital tooth and a lingual point.

FIG. 2(B) illustrates an embodiment that includes a lingual point 222 for the digital tooth 102 in the digital model 100. The lingual point 222 can be any point on the lingual side 226 of the digital tooth 102 along a lingual boundary region 224 between the digital tooth 102 and a digital gum line 228 and/or neighboring digital teeth 230 and 232 on the lingual side 226. The lingual side 226 can be, for example, on the side of the digital tooth 102 nearest the tongue region.

In some embodiments, the facial point 202 can be along a digital gum line 208 of the digital model 100, for example. In some embodiments, the lingual point 222 can be along a digital gum line 228 of the digital model 100, for example. In some embodiments, the computer-implemented method can receive the digital model 100 and display part or all of the digital model 100 on a display such as a screen or other display device, for example. An input device such as a mouse, keyboard and/or touch sensitive screen can be used to select one or more points (regions) on the digital model 100. The facial point 202 and the lingual point 222 can be selected by a user for example, in some embodiments, using the input device and the display.

Figure 3:
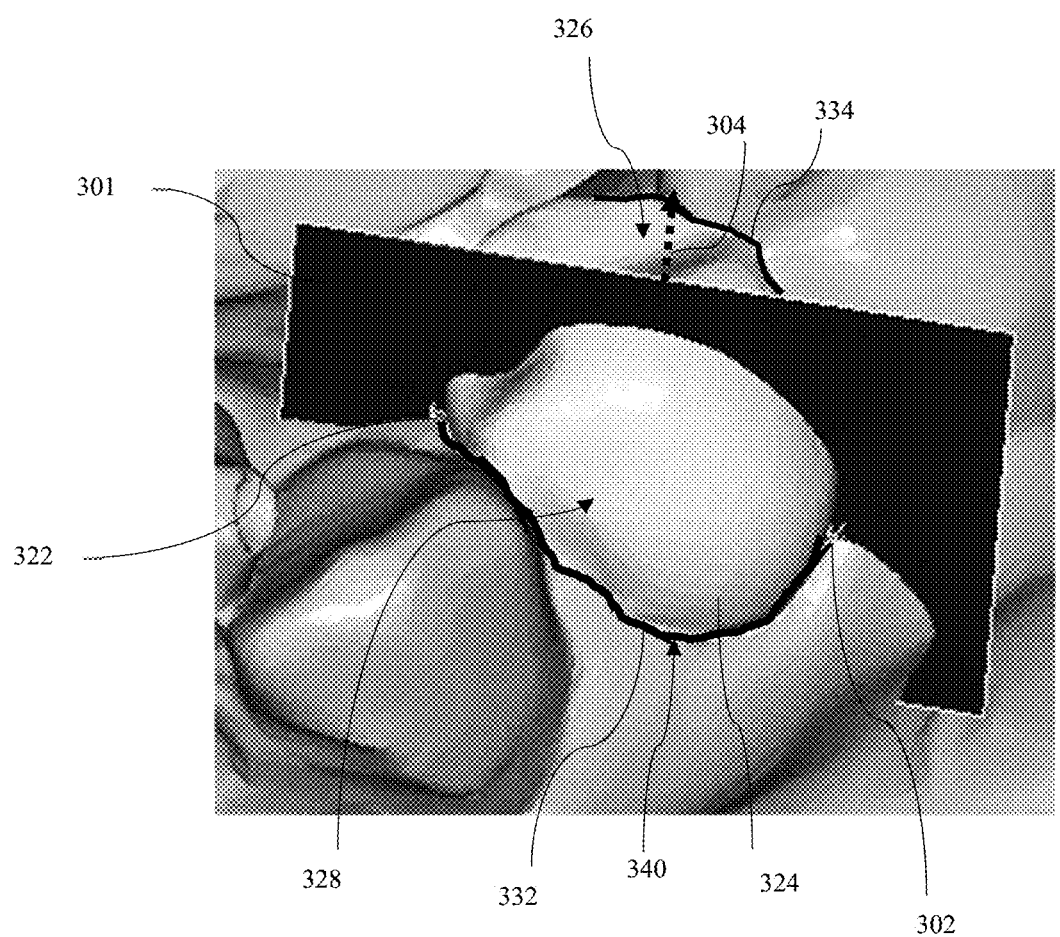
FIG. 3 is a perspective view of a digital model with a separation region.

The computer-implemented method can, in some embodiments, determine a separation region oriented through the facial point and the lingual point. The separation region can optionally also be oriented along an occlusal direction. FIG. 3 illustrates a separation region 301 oriented along an occlusal direction 304 through the facial point 302 and the lingual point 322 for the digital tooth 324. The occlusal direction is a normal to an occlusal plane and the occlusal plane can be determined for the digital model using any technique known in the art. For example, one technique is described in AN AUTOMATIC AND ROBUST ALGORITHM OF REESTABLISHMENT OF DIGITAL DENTAL OCCLUSION, by Yu-Bing Chang, James J. Xia, Jaime Gateno, Zixiang Xiong, Fellow, IEEE, Xiaobo Zhou, and Stephen T. C. Wong in IEEE TRANSACTIONS ON MEDICAL IMAGING, VOL. 29, NO. 9, SEPTEMBER 2010, the entirety of which is incorporated by reference herein. Alternatively, in some embodiments, the occlusal direction can be specified by a user using an input device such as a mouse or touch screen to manipulate the digital model on a display, for example, as described herein. In some embodiments, the occlusal direction can be determined, for example, using the Occlusion Axis techniques described in PROCESSING DIGITAL DENTAL IMPRESSION U.S. patent application Ser. No. 16/451,968, of Nikolskiy et al., the entirety of which is incorporated by reference herein.

In some embodiments, the separation region 301 can be a plane, for example, which can optionally be oriented to extend along the occlusal direction 304 (parallel to the occlusion direction) and extending through the facial point 302 and the lingual point 322, for example.

Figure 4:
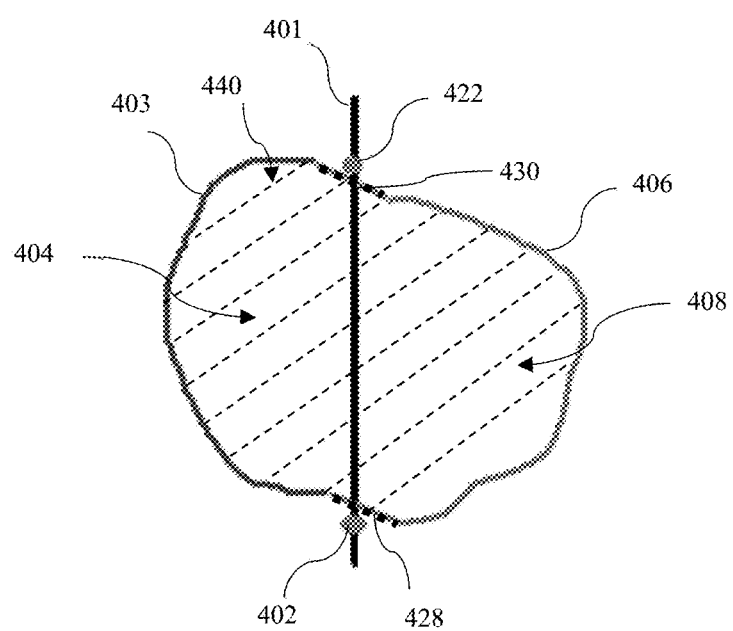
FIG. 4 is an orthogonal view of an illustration depicting a top view of an example of a digital tooth.

In some embodiments, the computer-implemented method can include determining a first segment path along the digital tooth boundary on a first side of the separation region and determining a second segment path along the digital tooth boundary on a second side of the separation region. FIG. 4 is an illustration looking down along the occlusion direction onto a digital tooth. The figure illustrates an embodiment in which the computer-implemented method can determine a first segment path 403 on a first side 404 of the separation region 401 and a second segment path 406 a second side 408 of the separation region 401. The computer-implemented method can receive a facial region and a lingual region, for example, and determine the closest digital surface triangle edge to each boundary point in some embodiments. For example, the computer-implemented method can determine a facial point 402 and a lingual point 422 as illustrated in FIG. 4. The computer-implemented method can determine the closest triangle edge to the facial point 402 as facial triangle edge 428. The facial triangle edge 428 can be an edge crossed by the separation region 301 and closest among all such crossed edges to the facial point 402 in some embodiments, for example. The computer-implemented method can determine the closest triangle edge to the lingual point 422 as lingual triangle edge 430. The lingual triangle edge 430 can be an edge crossed by the separation region 401 and closest among all such crossed edges to the lingual point 422 in some embodiments, for example. In some embodiments, the first segment path 403 and the second segment path 406 can be determined by extending from the facial triangle edge 428 and the lingual triangle edge 430 along digital surface triangle edges.

In some embodiments, the first segment path 403 can be a shortest path between the facial point 402 and the lingual point 422 along a digital surface of the first side 404, for example, with edge length as described below. In some embodiments, the second segment path 406 comprises a shortest path between the facial point 202 and the lingual point 222 along a digital surface of the second side 408, for example, with edge length as described below.

In some embodiments, the separation region 301 can separate the digital tooth 324 into a mesial side 326 and a distal side 328, for example. In some embodiments, the first side 404 can be the mesial side 326 and the second side 408 can be the distal side 328, for example, or vice versa.

In some embodiments, the first segment path 403 and second segment path 406 can be determined using Dijkstra's shortest path algorithm known in the art, using either the facial point 402 or the lingual point 422 as the initial digital surface point, for example. In some embodiments, the computer-implemented method can determine the first segment path 403 using the shortest path algorithm by evaluating only edges between digital surface points on the first side 404 of the separation region 301 for example. In some embodiments, the computer-implemented method can determine the second segment path 406 using the shortest path algorithm by evaluating only edges between digital surface points on the second side 408 as digital surface points, for example. In some embodiments, the computer-implemented method can perform the following:

1. Set an initial digital surface point. In some embodiments, the initial digital surface point can be the facial point 402. Alternatively, in some embodiments, the initial digital surface point can be the lingual point 422.
2. Mark all digital surface points on one side of the separation region 401 as unvisited. Generate an unvisited set of all unvisited digital surface points. In some embodiments, the one side can be the first side 404. Alternatively, in some embodiments, the one side can be the second side 408.
3. Assign every digital surface point on the one side a tentative distance value. The tentative distance value for the initial digital surface point is assigned to zero and the tentative distance value for all other digital surface points on the one side is assigned to infinity or the highest possible value or larger than the sum of all edge lengths, for example. Set the initial digital surface point as the current digital surface point.
4. For the current digital surface point, consider all unvisited neighboring digital surface points on the one side and determine their calculated tentative distances (e.g. edge length between the current digital surface point and the particular unvisited neighboring digital surface point) through the current digital surface point. In some embodiments, the calculated tentative distance can determine an edge length between current digital surface point and the particular unvisited neighboring digital surface point based on digital surface curvature. In some embodiments, the computer-implemented method can include an angle-dependent factor in determining an edge length, for example. For example, in some embodiments, the computer-implemented method can determine the tentative distance as follows:

$$f(e_i) = |e_i| \exp(k \cdot \sin \alpha_i), \text{ or } f(e_i) = |e_i| \exp(k \cdot \alpha_i)$$

where $f(e_i)$ is the length of edge $e_i$ for the algorithm between the current digital surface point and the particular unvisited neighboring digital surface point, $|e_i|$ is Euclidean distance in 3D between two ends of the edge, k is a constant, such as 1.8 in some embodiments, for example. A greater magnitude of the constant k can lead to preferring paths going through regions of higher curvature. The sign of the constant can define which edges will be preferred by the algorithm: concave or convex, and $\alpha_i$ is dihedral angle of the triangular surface at edge $e_i$, $\sin \alpha_i$ is the sine of that angle that can be, for example, computationally faster to find than $\alpha_i$ itself in some embodiments, for example. In some embodiments, $\alpha_i$ and/or $\sin \alpha_i$ can be the angle-dependent factor, for example. The boundary between the tooth and the gum can have significantly higher curvature than the rest of the surface. With edge length $f(e_i) = |e_i| \exp(k \cdot \sin \alpha_i)$, the length of edges in the digital tooth-gum line boundary region is significantly smaller than in other regions. The computer-implemented method can accordingly determine the shortest path along the digital tooth-gum line junction.

5. Compare the newly calculated tentative distance to the current assigned value and assign the smaller one. For example, if the current digital surface point A is marked with a distance of 6, and the edge connecting it with a neighboring digital surface point B has length 2, then the distance to B through A will be 6+2=8. If B was previously marked with a distance greater than 8 then change it to 8. Otherwise, keep the current value.

6. After considering all of the unvisited neighbors of the current digital surface point, mark the current digital surface point as visited and remove it from the unvisited set. A visited digital surface point will never be checked again.

7. If the destination digital surface point has been marked visited (when planning a route between two specific digital surface points) or if the smallest tentative distance among the digital surface points in the unvisited set is infinity, or the highest possible value, or larger than the sum of all edge lengths for example (when planning a complete traversal; occurs when there is no connection between the initial digital surface point and remaining unvisited digital surface points), then stop. The algorithm has finished.

Otherwise, select the unvisited digital surface point that is marked with the smallest tentative distance, set it as the new "current digital surface point", and go back to step 4.

The algorithm can stop once the destination digital surface point has the smallest tentative distance among all "unvisited" digital surface points (and thus could be selected as the next "current").

The computer-implemented method can repeat the steps on the other side of the separation region 401 (this can be performed simultaneously or sequentially). In this manner, the computer-implemented method can determine the first segment path 403 along the first side 404 and the second segment path 406 along the second side 408. The first segment path 403 and the second segment path 406 can be digital surface triangle edges in some embodiments for example.

In some embodiments, the first segment path 403 connects to one side of the facial triangle edge 428 and one side of the lingual triangle edge 430. In some embodiments, the second segment path 406 connects to the other side of the facial triangle edge 428 and the other side of the lingual triangle edge 430. The connected first segment path 403, second segment path 406, facial triangle edge 428, and the lingual triangle edge 430 together can form a boundary loop in some embodiments. The boundary loop can be closed in some embodiments, having an enclosed inner loop region 440, for example.

Figure 5A:
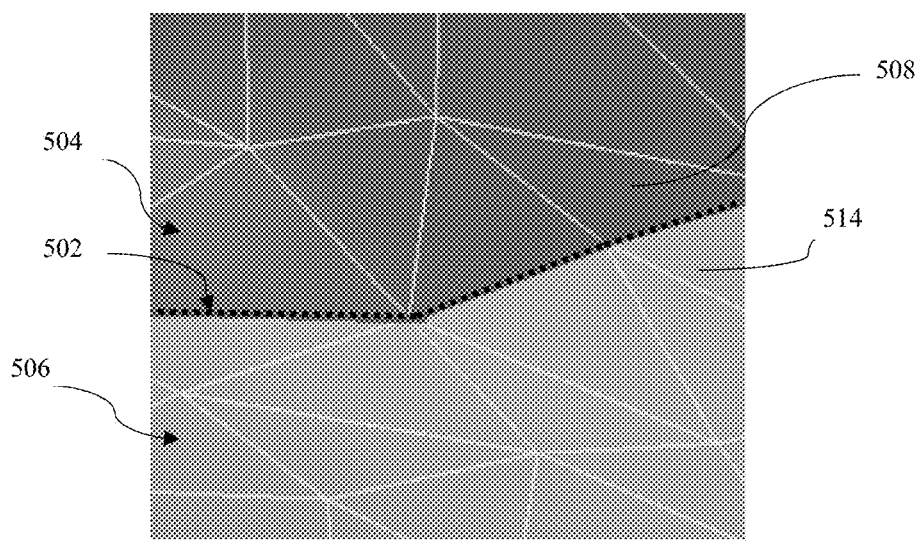
FIG. 5(A) is perspective view of an illustration depicting a portion of an example of a boundary loop.

In some embodiments, the computer implemented method can further include providing a segmented digital tooth from the first segment path and the second segment path. As illustrated in FIG. 3, the computer implemented method can include providing a segmented digital tooth 324 from the first segment path 332 and the second segment path 334. This can include, for example, providing a digital surface of the digital tooth 324 by determining digital surface triangles within the boundary loop 340, for example. FIG. 5(A) illustrates an example showing a portion of a boundary loop 502 with a digital tooth region 504 within the portion of the boundary loop 502 and a digital non-tooth region 506 outside of the portion of the boundary loop 502. The digital tooth region 504 and the digital non-tooth region 506 can include digital surface triangles such as digital surface triangle 508 and digital surface triangle 514, respectively, for example.

Figure 5B:
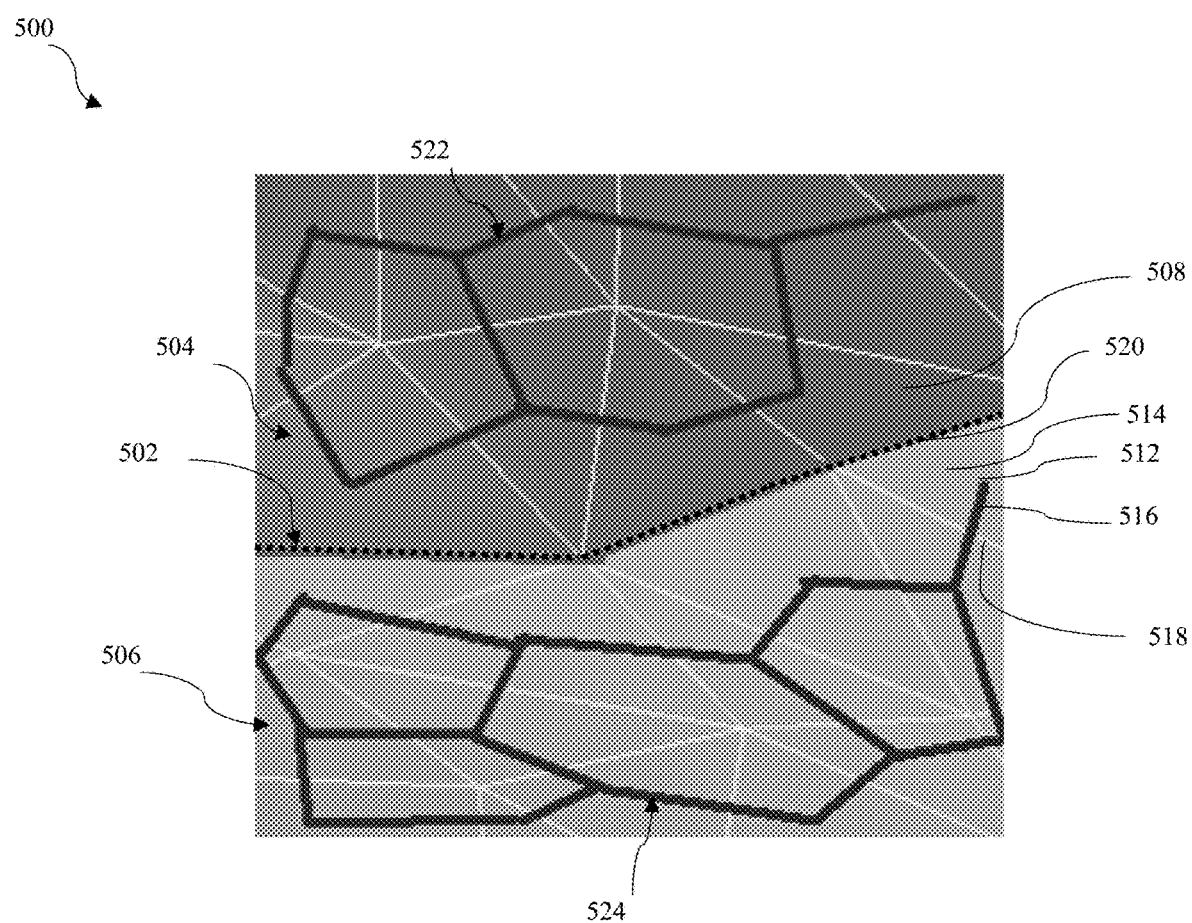
FIG. 5(B) is perspective view of an illustration depicting a portion of an example of a dual-graph.

In some embodiments, the computer-implemented method determining the digital surface of the digital tooth can include generating a dual-graph of the original digital surface triangles. The computer-implemented method can generate the dual-graph such that dual-graph vertices correspond to digital surface triangles of the original digital surface and dual-graph edges correspond to shared digital surface triangle edges except where a shared digital surface triangle edge is part of the boundary loop. For example, as illustrated in FIG. 5(B), the computer-implemented method can generate a dual-graph vertex 512 for a digital surface triangle 514 in a portion of a digital model 500. The computer-implemented method can generate a dual-graph edge 516 for shared digital surface triangle edge 518, for example. The computer-implemented method does not generate a dual-graph edge for shared digital surface triangle edge 520 because it is part of the boundary loop 502. The computer-implemented method can repeat this process for every digital surface triangle in the digital model. In this manner, the computer-implemented method can in some embodiments generate a dual-graph for the digital surface of the digital model. In some embodiments, each dual-graph edge can cross every original surface edge, but no dual-graph edge crosses the boundary loop. In some embodiments, the dual-graph can include an inner dual-graph region and an outer dual-graph region that are separated by the boundary loop, for example. The inner dual-graph region can be an interconnected dual-graph region enclosed by the boundary loop, and the outer dual-graph region can be an interconnected dual-graph region outside of the boundary loop. The boundary loop can separate the inner dual-graph region from the outer dual-graph region in some embodiments. For example, as illustrated in FIG. 5(B), the dual-graph can include an inner dual-graph region 522 and an outer dual-graph region 524 separated by the boundary loop 502.

In some embodiments, determining a digital tooth surface can include performing a search on the dual-graph. The computer-implemented method can, for example, determine a digital tooth surface based on interconnections between vertices of the dual-graph. In some embodiments, the search can be, for example, a conventionally known breadth-first search. In the breadth-first search, the computer-implemented method can load the dual-graph and a starting vertex root, for example. In some embodiments, the starting dual-graph root vertex can be any dual-graph vertex. The computer-implemented method can explore all neighboring dual-graph vertices at the current depth before moving to the next depth level and label them as discovered. The computer-implemented method can then advance to the next depth level and repeat the process until there are no more undiscovered dual-graph vertices, for example. The computer-implemented method can in this manner determine the interconnected vertices of the dual-graph to determine a discovered dual-graph. The breadth-first search technique can be applied to a digital tooth without one or more tunnels, for example. In some embodiments, the computer-implemented method can determine conventionally known breadth-first searching as follows:

procedure Breadth_First_Search(Dual_Graph, start_vert)
        is
        let Q be a queue
        label start_vert as discovered

```
Q.enqueue(start_vert)
while Q is not empty do
    v:=Q.dequeue( )
    for all edges from v to y in Dual_Graph.adjacent-
        Edges(v) do
        if y is not labeled as discovered then
            label y as discovered
            y.parent:=v
            Q.enqueue(y)
```

In some embodiments, the search can be, for example, a conventionally known depth-first search. In a depth-first search, the computer-implemented method can load the dual-graph and a starting vertex root, for example. In some embodiments, the starting vertex root can be any dual-graph vertex. In some embodiments, the computer-implemented method can perform conventionally known depth-first searching on the dual-graph as follows: The input can be, for example, a graph Dual_Graph, G, and a vertex vert of G and an output can be, for example, every vertex reachable from vert labeled as discovered. The depth-first search technique can be applied to a digital tooth without one or more tunnels, for example. In some embodiments, the computer-implemented method can determine conventionally known depth-first searching as follows:

```
procedure Depth_First_Search (Dual_Graph, vert) is
    label vert as discovered
    for all directed edges from vertex to y that are in
        Dual_Graph.adjacentEdges(vert) do
        if vert y is not labeled as discovered then
            recursively call Depth_First_Search(Dual_Graph,
                y)
```

In some embodiments, the computer-implemented method can perform depth-first searching on the dual-graph as follows, for example:

```
procedure Depth_First_Search Iterative(Dual_Graph,
    vert) is
    let S be a stack
    S.push(vert)
    while S is not empty do
        vert=S.pop( )
        if vert is not labeled as discovered then
            label vert as discovered
            for all edges from vert to y in Dual_graph.adjacent-
                Edges(vert) do
                S.push(y)
```

In some embodiments, if the discovered dual-graph is within the boundary loop and/or if the starting dual-graph root vertex was within the boundary loop, for example, then the computer-implemented method would determine that the discovered dual-graph is an inner dual-graph region and hence belongs to the digital tooth. The computer-implemented method can determine all other dual-graph vertices as belonging to the outer dual-graph, and therefore be of the digital gum and other surrounding digital teeth. In some embodiments, if the discovered dual-graph is outside the boundary loop and/or if the starting dual-graph root vertex was outside the boundary loop, for example, then the computer-implemented method can determine that the discovered dual-graph is an outer dual-graph region and hence belongs to the digital gum and other surrounding digital teeth. The computer-implemented method can determine that all other dual-graph vertices belong to the inner dual-graph region, and therefore be of the digital tooth. The computer-implemented method can, based on the discovered dual-graph vertices, determine the digital surface of the digital tooth in some embodiments, for example, and the digital surface belonging to surrounding teeth and the gum region.

Figure 6:
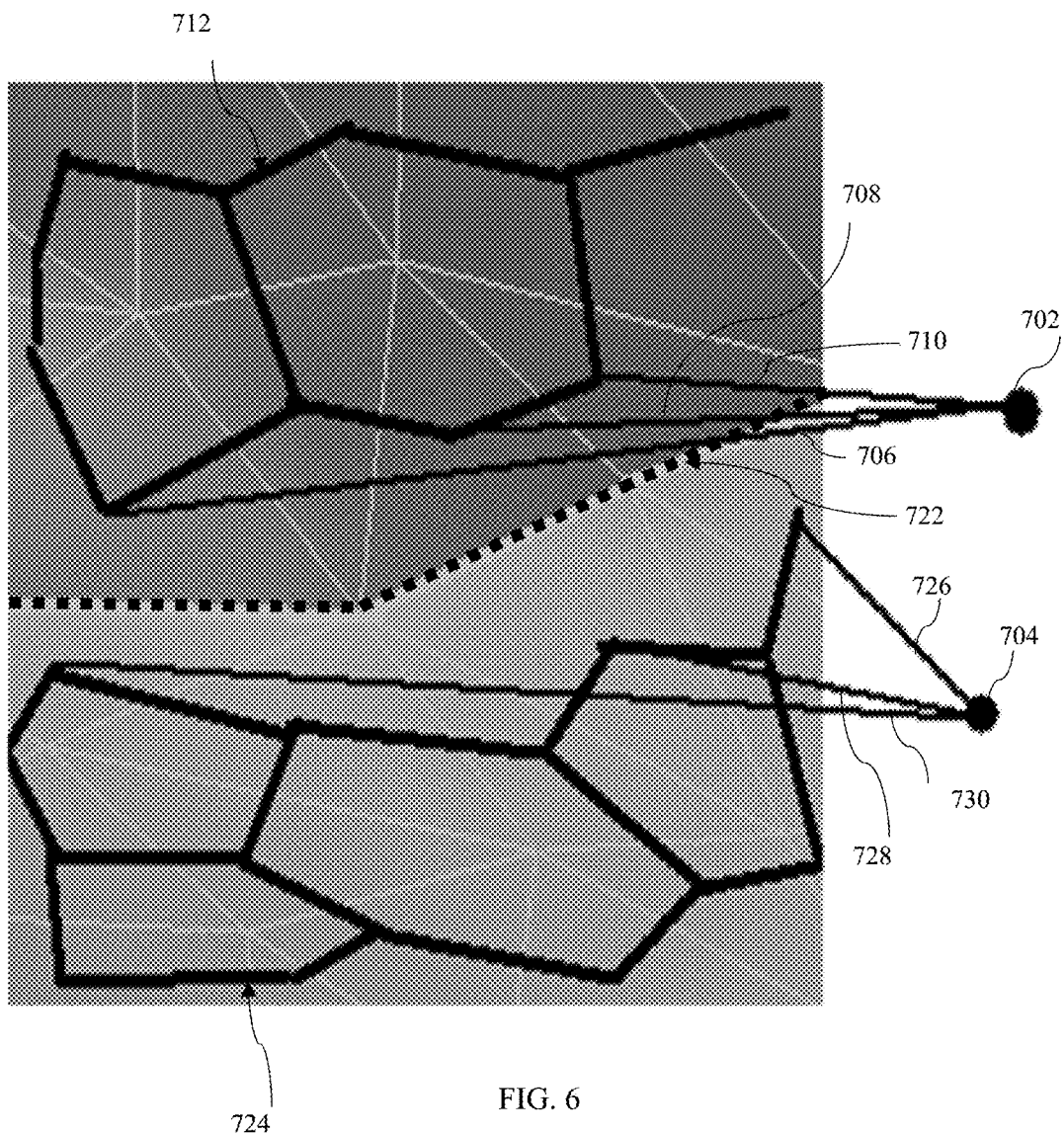
FIG. 6 is perspective view of an illustration of a modified dual-graph.

In some embodiments, the computer-implemented method determining the digital surface of the digital tooth can include the computer-implemented method generating a modified dual-graph and determining a minimum cut/maximum flow of the modified dual-graph. In some embodiments, this can be used for a digital tooth with or without tunnels, for example. To generate the modified dual-graph, the computer-implemented method can generate the dual-graph as described previously and add two new vertices to the dual-graph: a source vertex and a sink vertex, in some embodiments, for example. FIG. 6 illustrates one example of a modified dual-graph with a source vertex 702 (source) and a sink vertex 704 (sink) added. In some embodiments, the computer-implemented method can connect the source vertex 702 to one or more dual-graph vertices on one side of the boundary loop 722. The connected one or more vertices can be those whose corresponding triangles share at least one edge with the boundary loop 722. In the example illustrated in the figure, the computer-implemented method connects the source vertex 702 to vertices on a first dual-graph region 712 that share edges with the boundary loop 722. In some embodiments, the computer-implemented method can connect the source vertex 702 to a second dual-graph region 724 instead. The computer-implemented method can connect the source vertex 702 by generating a new source vertex edge between the source vertex 702 and each corresponding dual-graph vertices on the one side to generate one or more source vertex edges such as a first source vertex edge 706, a second source vertex edge 708, and a third source vertex edge 710, for example. In some embodiments, the computer-implemented method can set the length (capacity) of all new source vertex edges to infinity, or a very large number. In some embodiments, the computer-implemented method can set the length (capacity) of all new source vertex edges to a value higher than the sum of the capacities of all dual graph edges, for example.

In some embodiments, the computer-implemented method can connect the sink vertex 704 to one or more dual-graph vertices on the other side of the boundary loop 722. The connected one or more vertices can be those corresponding triangles share at least one edge with the boundary loop 722. In the example illustrated in the figure, the computer-implemented method connects the sink vertex 704 to a second dual-graph region 724. In some embodiments, the computer-implemented method can connect the sink vertex 704 to the first dual-graph region 712 instead. The computer-implemented method can connect the sink vertex 704 by generating a new edge between the sink vertex 704 and each corresponding dual-graph vertices on the other side to generate one or more sink vertex edges such as first sink vertex 726, second sink vertex 728, and third sink vertex 730. In some embodiments, the computer-implemented method can set the length (capacity) of all new sink edges to infinity, or a very large number, or any number that is larger than the sum of all edge lengths, for example. In some embodiments, the computer-implemented method can set the length (capacity) of all new sink vertex edges to a value higher than the sum of the capacities of all dual graph edges, for example.

In some embodiments, the computer-implemented method can divide the modified dual-graph into two regions: one with the source vertex, called the source dual-graph region, and one with the sink vertex, called the sink dual-graph region, for example. In some embodiments, the computer-implemented method can divide the modified dual-graph by minimizing the summed capacity of dual-graph edges between the source dual-graph region and the sink dual-graph region. The computer-implemented method can minimize the summed capacity of dual-graph edges between the source dual-graph region and the sink dual-graph region in the modified dual-graph, in some embodiments, for example, by determining a minimum cut/maximum flow from the source to the sink. In some embodiments, the computer-implemented method can, for example, receive the dual-graph and the source and sink vertices. The computer-implemented method can in some embodiments for example determine the maximal flow from the source-vertex to the sink-vertex that does not oversaturate any dual-graph edge's capacity and determine the minimal cut, which divides the dual-graph in two components (one with source-vertex and another with sink-vertex), where the summed capacity of cut dual-graph edges is minimal. In some embodiments that involve digital tooth and gum line boundary determination, minimizing the sum of capacities of cut dual-graph edges can cut at high curvature concave digital surface triangle edges.

In some embodiments, the capacity of each dual-graph edge can be the same as the length determined for its corresponding primitive (digital surface triangle) edge. The computer-implemented method can determine each dual-graph edge's capacity as $f(e_i)=|e_i| \exp(k \cdot \sin \alpha_1)$ as described previously with respect to determining the length (capacity) of each digital surface triangle's edge.

In some embodiments, where the computer-implemented method assigns a positive value of the angle $\alpha_i$ as corresponding to concave edges and a negative value to convex edges and where k is negative (for example $k=-1.8$), high curvature concave edges can get a very small capacity, and high curvature convex edges can get a very large capacity. The computer-implemented method can utilize this setting to determine digital tooth and digital gum line boundary in some embodiments, for example. In some embodiments, where k is positive (for example $k=1.8$), high curvature concave edges can get a very large capacity, and high curvature convex edges can get a very small capacity. The computer-implemented method can utilize this setting to determine a margin line on a digital tooth prepared to receive a crown in some embodiments, for example.

Determining minimum cut/maximum flow is known in the art and can be performed using a variety of techniques. In some embodiments, the computer-implemented method in determining the minimum cut/maximum flow can use a modified dual-graph with source and sink vertices and lengths or capacities for each modified dual-graph edge. One example of minimum-cut/max-flow is described in "AN EXPERIMENTAL COMPARISON OF MIN-CUT/MAX-FLOW ALGORITHMS FOR ENERGY MINIMIZATION IN VISION" by Yuri Boykov and Vladimir Kolmogorov, IEEE Transactions on PAMI, Vol. 26, No. 9, pp. 1124-1137, September 2004, the entirety of which is hereby incorporated by reference. The computer-implemented method can determine the minimum cut/maximum flow using other techniques known in the art. The computer-implemented method can, in some embodiments, perform a growth stage, an augmentation stage, and an adoption stage on the source tree and the sink tree, for example to divide a dual-graph using minimum cut/maximum flow.

In some embodiments, in the growth stage, active dual-graph vertices can acquire neighboring dual-graph vertices that are connected through dual-graph edge having a capacity-value greater than zero. The acquired dual-graph vertices become active and belong to a search tree of the current active dual-graph vertex. If no more valid connections to neighbor dual-graph vertices exist, the current dual-graph vertex is set to passive and the grow phase continues with the next active dual-graph vertex. The grow phase ends when no more active dual-graph vertices exist, or a dual-graph vertex encounters a dual-graph vertex from the other search tree through an unsaturated dual-graph edge. In this case, a path from source to sink is found.

In some embodiments, the path found from the grow stage can be augmented in an augment stage. The augment phase can determine the found path's bottleneck capacity and update the residual-capacity of dual-graph edges from the found path by subtracting the bottleneck capacity from the residual capacity. The augment phase can update the residual capacity of the reverse dual-graph edges by adding the bottleneck capacity. The augment phase can destroy the built search trees as it creates at least one saturated dual-graph edge. This can, in some embodiments collapse the search trees into forests, since search trees require each of their dual-graph vertices to have a valid (non-saturated) connection to a terminal.

In some embodiments search trees can be reconstructed in an adoption stage. In some embodiments, all dual-graph vertices after the first orphan in the found path can be set as free dual-graph vertices. Alternatively, in some embodiments, the adoption phase gives orphans new parents. For example, the computer-implemented method can in the adoption phase check the neighboring dual-graph vertices to determine whether they validly connect to the same terminal as this dual-graph vertex did. This can be a path with unsaturated dual-graph edges, for example. If such a dual-graph vertex exists, then the computer-implemented method can assign the dual-graph vertex as the new parent of the current orphan and the forest is added back to the search tree. If no new valid parent is found, this dual-graph vertex becomes a free dual-graph vertex, and it's children become orphans. The adoption phase terminates when no more orphans exist.

The computer-implemented method can in this manner determine which digital surface triangles correspond to the digital tooth and which digital surface triangles correspond to a gum line and other digital teeth, for example.

In some embodiments, where no tunnel exists between the inner dual-graph and the outer dual-graph separated by the boundary loop (i.e. the inner and outer dual-graphs are completely disconnected), the computer-implemented method performing the minimum cut/maximum flow determines an empty cut and zero flow since no connection between the inner dual-graph and the outer dual-graph exists. In some embodiments, the modified dual-graph is therefore separated at the boundary loop, for example.

Figure 7A:
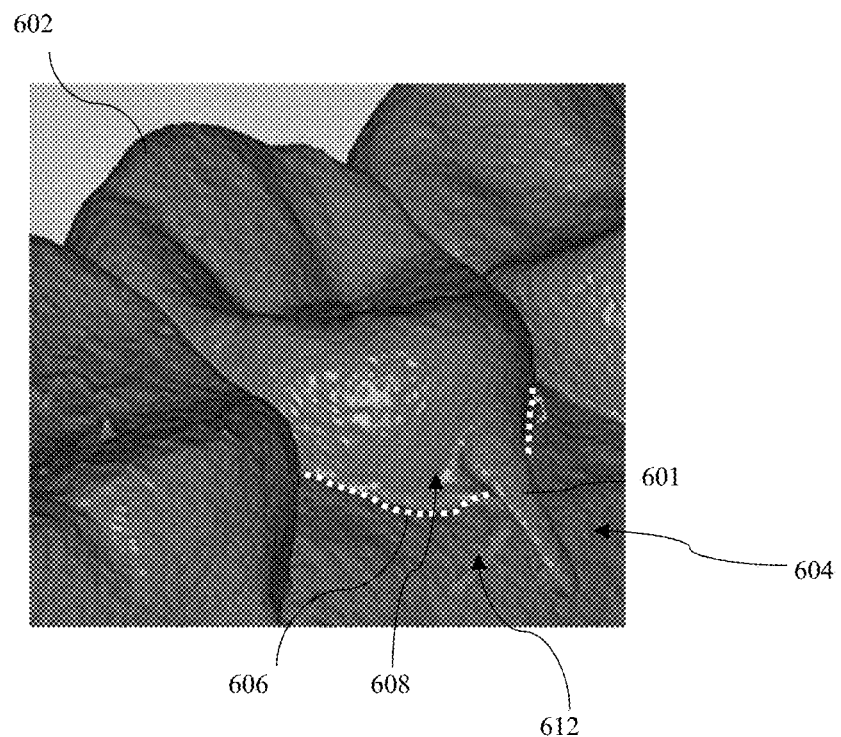
FIG. 7(A) is a perspective view of a digital tooth with a tunnel.
Figure 7B:
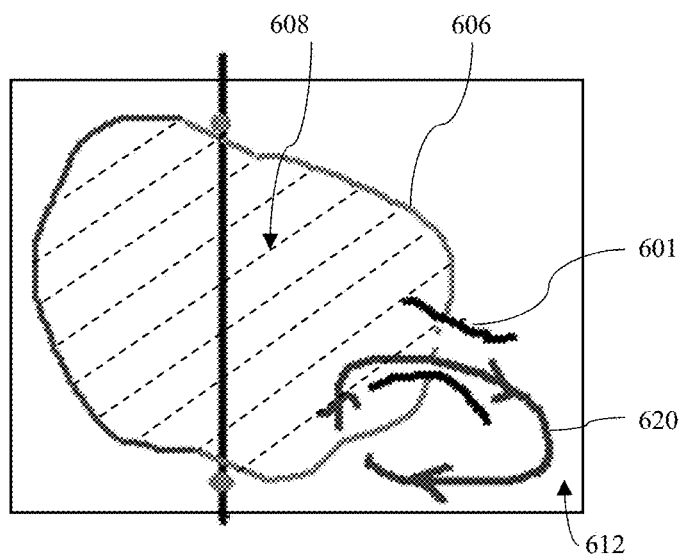
FIG. 7(B) is a perspective view of an illustration depicting a top view of an example of a digital tooth with a tunnel.

Alternatively, a digital tooth can contain one or more tunnels, such as tunnel 601 on digital tooth 602 as illustrated in FIG. 7(A), for example. The one or more tunnels can extend and connect between the digital tooth 602 and the digital gum line 604 and/or surrounding digital teeth without intersecting a boundary loop 606 and connecting an inner boundary loop region 608 with an outer boundary loop region 612, for example. As illustrated in FIG. 7(B), due to the connection, the tunnel 601 can extend over or under the enclosed boundary loop 606, thereby connecting an inner boundary loop region 608 with an outer boundary loop region 612 through a path 620, for example. In the figure, the boundary loop 606 is under the tunnel 601, and therefore appears as a dashed segment. Because the inner boundary loop region 608 and the outer boundary loop region 612 connect, determining the digital tooth surface from the digital gum line/surrounding digital teeth regions can be challenging, since it is uncertain whether a digital surface of the digital tunnel region of the one or more tunnels belongs to the digital tooth 602 or gum line 604 and/or surrounding teeth.

Figure 8:
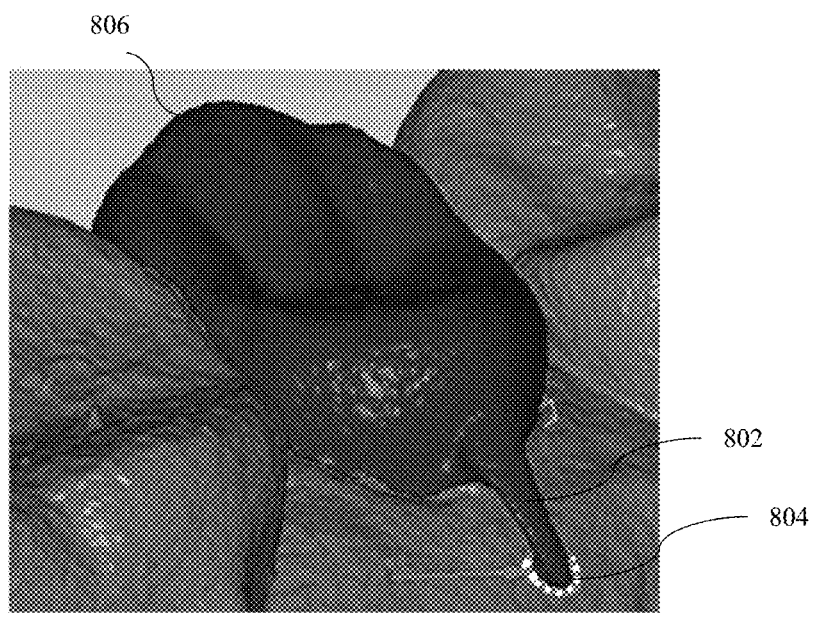
FIG. 8 is a perspective view of a segmented digital tooth with a tunnel.

In some embodiments, the computer-implemented method can process a digital model that includes one or more tunnels. The computer-implemented method can, for example, segment a digital tooth having a tunnel by dividing a modified dual-graph by minimizing the summed capacity of dual-graph edges between the source dual-graph region and the sink dual-graph region. The computer-implemented method can minimize the summed capacity of dual-graph edges between the source dual-graph region and the sink dual-graph region in the modified dual-graph, in some embodiments, for example, by determining a minimum cut/maximum flow from the source to the sink as described previously. In some embodiments, the computer-implemented method can perform the same steps as described previously to generate the boundary loop. In some embodiments, the computer-implemented method can for digital models with one or more tunnels determine the digital tooth surface by generating and searching the modified dual-graph, for example, as described previously. As discussed previously, since capacity is a product of a geometrical distance and a curvature based term, a split occurs at high curvature edges, and the geometrical distance of the split can be short, for example. In the presence of a tunnel, for example, such cut typically occurs at a tunnel end that has a smaller circumference and larger curvature as illustrated in the example of FIG. 8. In FIG. 8, tunnel 802 is cut at larger curvature/smaller circumference end 804, for example. The digital surface of the tunnel 802 is therefore included with the digital surface of the digital tooth 806. Accordingly, in some embodiments, a digital tooth with one or more tunnels can be segmented by determining the boundary loop as described previously, generating a modified dual-graph as described previously, and performing minimum cut/maximum flow on the modified dual-graph as described previously, for example.

One or more advantages of one or more features in some embodiments can include, for example, minimal user input, determining a precise segment boundary even if there are variations in tooth shapes, and/or the location of teeth is far from a dental arch (e.g. ectopic teeth), and or the gum-tooth boundary is not pronounced. One or more advantages of one or more features in some embodiments can include, for example, increased speed, support for full-arch, quadrant, and smaller digital models, and reduced errors. One or more advantages of one or more features in some embodiments can include, for example, determining either a digital tooth/digital gum line boundary or a digital margin line on a tooth prepared for a crown. One or more advantages of one or more features in some embodiments can include, for example segmenting teeth on a digital surface with one or more tunnels efficiently.

In some embodiments, the computer-implemented method can perform one or more features on one or more teeth in the digital model. Accordingly, the computer-implemented method can provide a digital model with one or more segmented digital teeth in some embodiments, for example.

One or more of the features disclosed herein can be performed and/or attained automatically, without manual or user intervention. One or more of the features disclosed herein can be performed by a computer-implemented method. The features—including but not limited to any methods and systems—disclosed may be implemented in computing systems. For example, the computing environment 14042 used to perform these functions can be any of a variety of computing devices (e.g., desktop computer, laptop computer, server computer, tablet computer, gaming system, mobile device, programmable automation controller, video card, etc.) that can be incorporated into a computing system comprising one or more computing devices. In some embodiments, the computing system may be a cloud-based computing system.

Figure 9:
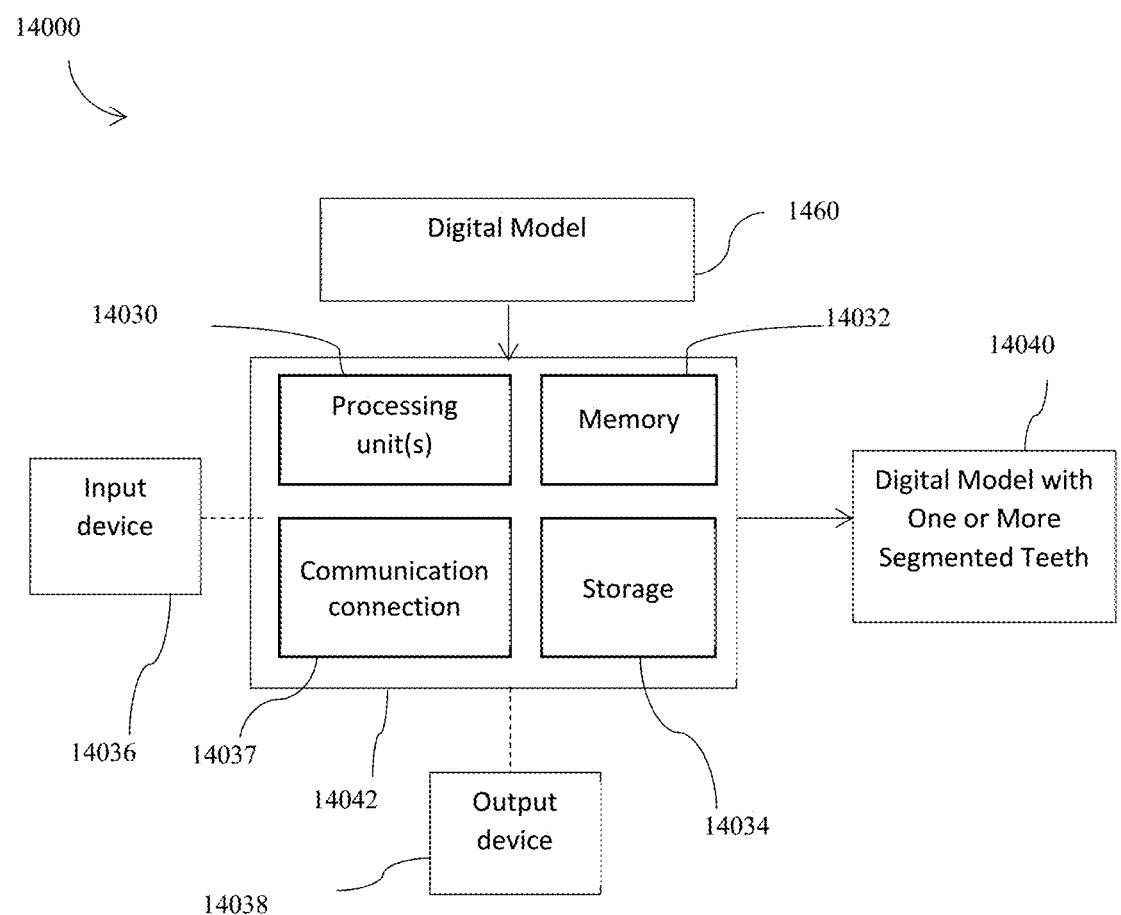
FIG. 9 is a diagram of a processing system.

FIG. 9 illustrates a processing system 14000 in some embodiments. The system 14000 can include a processor 14030, computer-readable storage medium 14034 having instructions executable by one or more processors 14030 to perform one or more steps described in the present disclosure. The system 14000 can receive a digital model 1460 and provide a digital model with one or more segmented teeth 14040.

A computing environment 14042 may include one or more processing units 14030 and memory 14032. The processing units execute computer-executable instructions. A processing unit 14030 can be a central processing unit (CPU), a processor in an application-specific integrated circuit (ASIC), or any other type of processor. In some embodiments, the one or more processing units 14030 can execute multiple computer-executable instructions in parallel, for example. In a multi-processing system, multiple processing units execute computer-executable instructions to increase processing power. For example, a representative computing environment may include a central processing unit as well as a graphics processing unit or co-processing unit. The tangible memory 14032 may be volatile memory (e.g., registers, cache, RAM), non-volatile memory (e.g., ROM, EEPROM, flash memory, etc.), or some combination of the two, accessible by the processing unit(s). The memory stores software implementing one or more innovations described herein, in the form of computer-executable instructions suitable for execution by the processing unit(s).

A computing system may have additional features. For example, in some embodiments, the computing environment includes storage 14034, one or more input devices 14036, one or more output devices 14038, and one or more communication connections 14037. An interconnection mechanism such as a bus, controller, or network, interconnects the components of the computing environment. Typically, operating system software provides an operating environment for other software executing in the computing environment, and coordinates activities of the components of the computing environment.

The tangible storage 14034 may be removable or non-removable, and includes magnetic or optical media such as magnetic disks, magnetic tapes or cassettes, CD-ROMs, DVDs, or any other medium that can be used to store information in a non-transitory way and can be accessed within the computing environment. The storage 14034 stores instructions for the software implementing one or more innovations described herein.

The input device(s) may be, for example: a touch input device, such as a keyboard, mouse, pen, or trackball; a voice input device; a scanning device; any of various sensors; another device that provides input to the computing environment; or combinations thereof. For video encoding, the input device(s) may be a camera, video card, TV tuner card, or similar device that accepts video input in analog or digital form, or a CD-ROM or CD-RW that reads video samples into the computing environment. The output device(s) may be a display, printer, speaker, CD-writer, or another device that provides output from the computing environment.

The communication connection(s) enable communication over a communication medium to another computing entity. The communication medium conveys information, such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Any of the disclosed methods can be implemented as computer-executable instructions stored on one or more computer-readable storage media 14034 (e.g., one or more optical media discs, volatile memory components (such as DRAM or SRAM), or nonvolatile memory components (such as flash memory or hard drives)) and executed on a computer (e.g., any commercially available computer, including smart phones, other mobile devices that include computing hardware, or programmable automation controllers) (e.g., the computer-executable instructions cause one or more processors of a computer system to perform the method). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media 14034. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, Python, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

EXAMPLES

The following are examples only, and should not be taken as limiting the scope of the disclosure.

Figure 10:
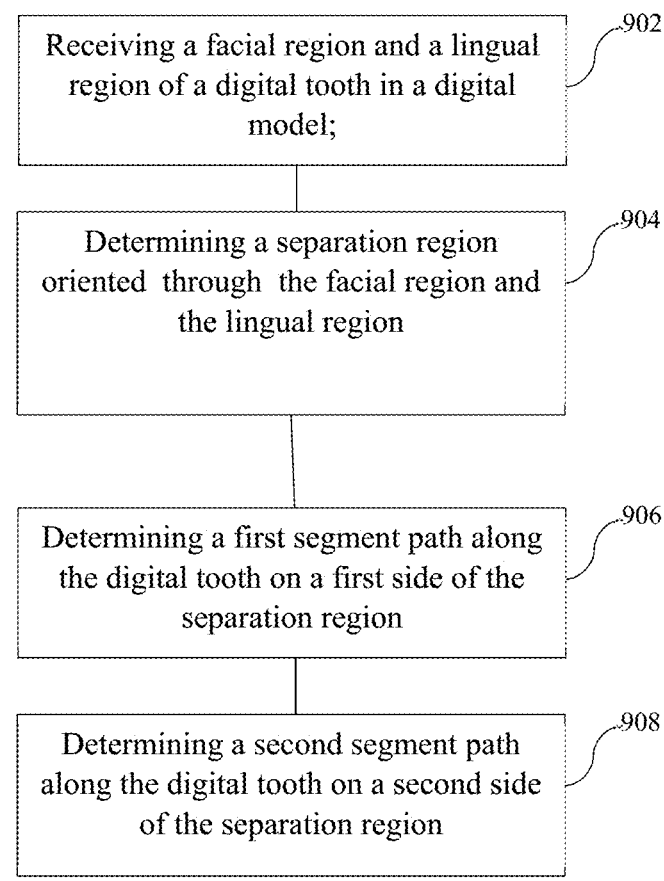
FIG. 10 is a flow chart illustrating a method of segmenting a digital tooth in a 3D digital model of dentition in some embodiments.

FIG. 10 illustrates an example of a computer-implemented method of segmenting a digital tooth in a 3D digital model of dentition in some embodiments. The method can include receiving a facial region and a lingual region of a digital tooth in a digital model at 902, determining a separation region oriented through the facial region and the lingual region at 904, determining a first segment path along the digital tooth on a first side of the separation region 906, and determining a second segment path along the digital tooth on a second side of the separation region 908.

The method can include several optional features. For example, the separation region can be oriented along an occlusal direction. In some embodiments, the separation region can be oriented through a facial point in the facial region and a lingual point in the lingual region, for example. The method can further include providing a segmented digital tooth from the first segment path and the second segment path. The facial point and the lingual point can be selected by a user. The first segment path can include a shortest path between the facial point and the lingual point along a digital surface of the first side. The second segment path can include a shortest path between the facial point and the lingual point along a digital surface of the second side. The separation region can be a plane. The first segment path can connect to the second segment path at the facial point and the lingual point. The facial point and the lingual point can be along a gum line of the digital model. The separation region can separate the digital tooth into a mesial side and a distal side. The first side can be the mesial side. The second side can be the distal side. The first and second segment path can be a boundary loop. The method can additionally optionally include determining a digital surface of the digital tooth between the first segment path and the second segment path. The digital tooth can include one or more tunnels.

Figure 11:
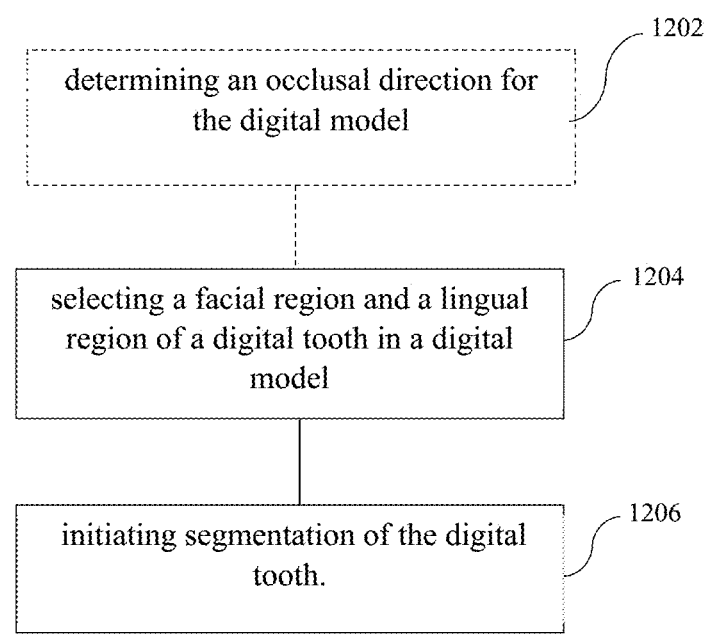
FIG. 11 is a flow chart illustrating a computer-implemented method of segmenting a digital tooth in a 3D digital model of dentition in some embodiments.

FIG. 11 illustrates an example of a computer-implemented method of segmenting a digital tooth in a 3D digital model of dentition that can optionally include selecting an occlusal direction for the digital model at 1202, selecting a facial region and a lingual region of a digital tooth in a digital model at 1204 and initiating segmentation of the digital tooth at 1206. Selecting the facial region and the lingual region can include selecting a facial point and a lingual point, respectively, in some embodiments, for example. Selecting the facial region and the lingual region can include selecting a facial region digital surface and a lingual region digital surface in some embodiments, for example. In some embodiments, segmentation is initiated, for example, as soon as both the facial region and the lingual region on a digital tooth are chosen. In some embodiments, other techniques known in the art can be used to initiate segmentation. In some embodiments, selecting an occlusal direction for the digital model at 1202, selecting a facial region and a lingual region of a digital tooth in a digital model at 1204 and initiating segmentation of the digital tooth at 1206 can be performed by a user, for example. In some embodiments selecting the occlusal direction can optionally be performed once per digital model. In some embodiments, selecting the occlusal direction can optionally be performed prior to initiating segmentation of the digital tooth. In some embodiments, segmentation can include one or more of the features described in the present disclosure. In some embodiments, selecting and initiating can be performed using an input device while viewing the digital model on a display, for example. In some embodiments, the computer-implemented method can allow the input device to manipulate the digital model displayed on the display. For example, in some embodiments, the computer-implemented method can rotate, zoom, move, and/or otherwise manipulate the digital model in any way as is known in the art. In some embodiments, the selecting and initiating and manipulation can be performed by a user using the input device. In some embodiments, segmentation can be initiated, for example, as soon as both the facial region and the lingual region on the digital tooth are chosen. In some embodiments, other techniques known in the art can be used to initiate segmentation, such as a user selecting another button. Segmentation can optionally include determining a separation region oriented through the facial region and the lingual region determining a first segment path along the digital tooth on a first side of the separation region and determining a second segment path along the digital tooth on a second side of the separation region. In some embodiments, the separation region can be oriented through a facial point in the facial region and a lingual point in the lingual region, for example. The method can optionally include providing a segmented digital tooth from the first segment path and the second segment path. The first segment path can include a shortest path between the facial point and the lingual point along a digital surface of the first side. The second segment path can include a shortest path between the facial point and the lingual point along a digital surface of the second side. The separation region can be a plane. The first segment path can connect to the second segment path at the facial point and the lingual point. The facial point and the lingual point can be along a gum line of the digital model. The separation region can separate the digital tooth into a mesial side and a distal side. The first side can be the mesial side. The second side can be the distal side. The first and second segment can comprise a boundary loop. The method can optionally additionally include determining a digital surface of the digital tooth between the first segment path and the second segment path. The digital tooth can contain one or more tunnels.

Figure 12A:
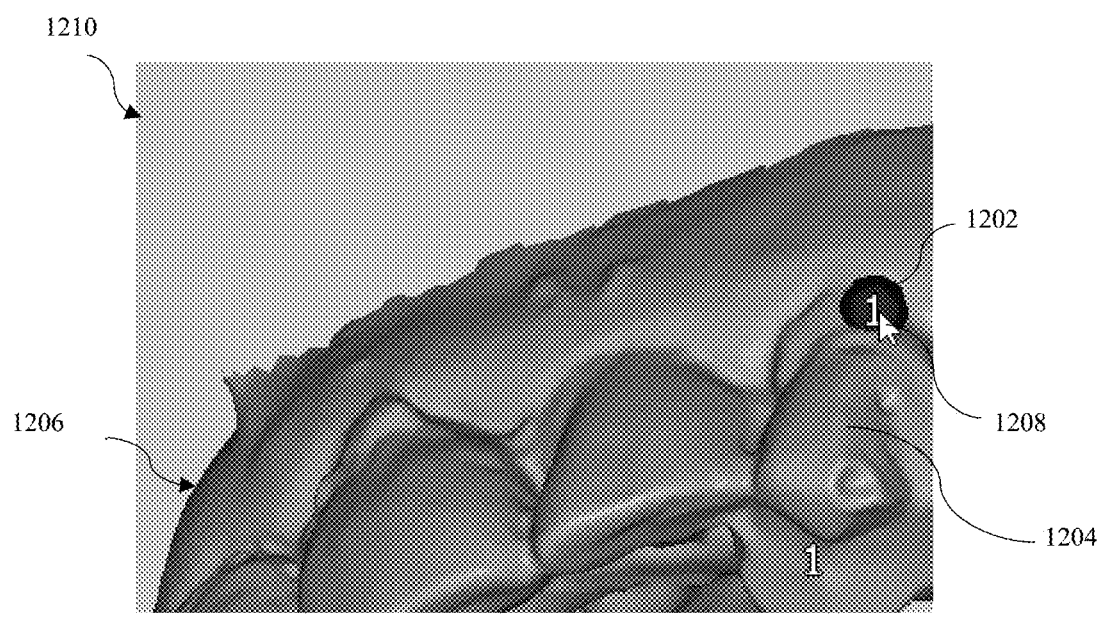
FIGS. 12(A)-12(C) are perspective views of a digital model of digital teeth in some embodiments.
Figure 12B:
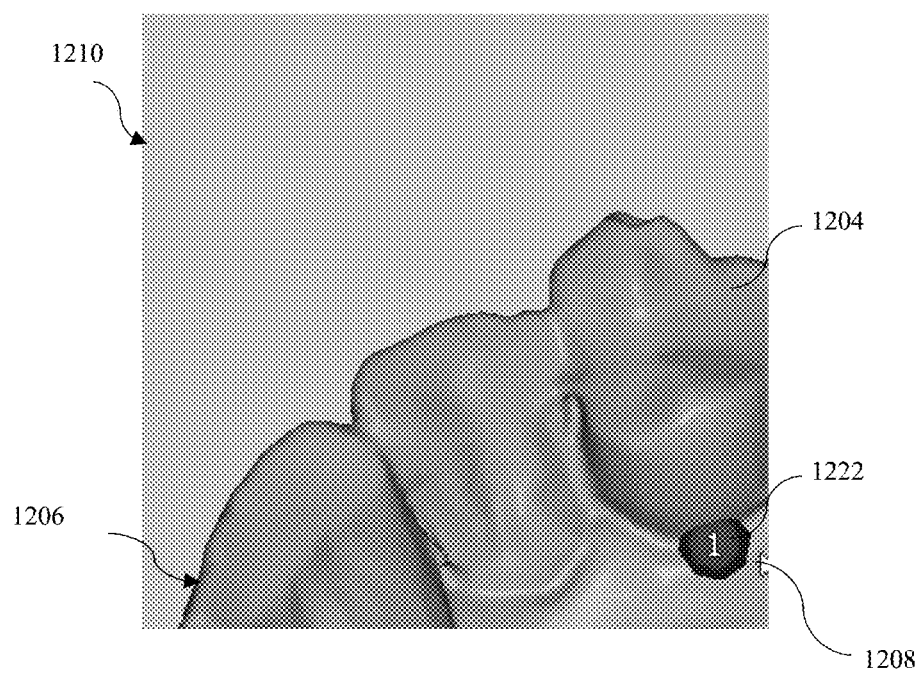
Figure 12C:
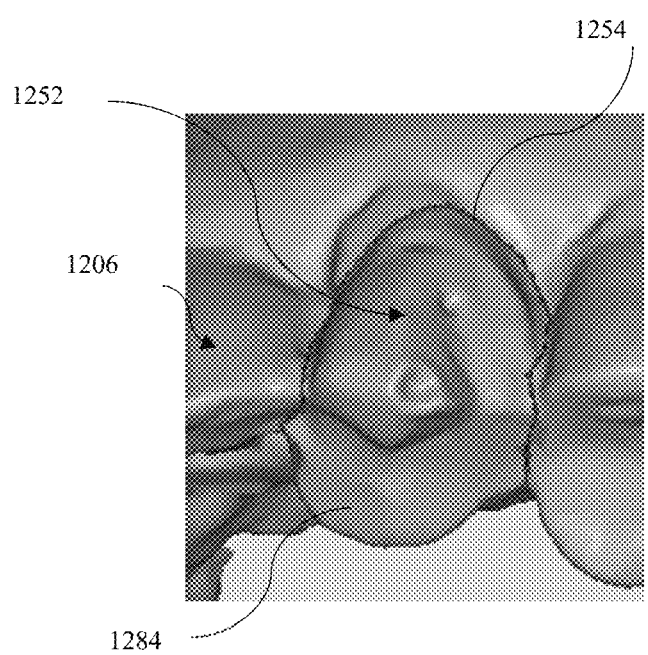

As illustrated in FIG. 12(A), a facial region 1202 can be selected on a digital tooth 1204 of a digital model 1206 using an input device whose pointer 1208 is shown on a display 1210, for example. In some embodiments, the facial region 1202 can be a point. In some embodiments, the facial region 1202 can be a facial region digital surface as discussed previously. As illustrated in FIG. 12(B), a lingual region 1222 can be selected on a digital tooth 1204 of a digital model 1206 using an input device whose pointer 1208 is shown on a display 1210. In some embodiments, the lingual region 1222 can be a point. In some embodiments, the lingual region 1222 can be a lingual region digital surface as discussed previously. The pointer 1208 can be used to select a region of one point by clicking on an input device such as a mouse or tapping on a touch screen for example. A digital surface of multiple points can be selected by dragging the pointer 1208 across a digital surface, in some embodiments, for example. Other techniques known in the art can be used to select a point or digital surface. As illustrated in FIG. 12(C), segmentation can be initiated to provide segmented tooth 1284 having a boundary loop 1254 and the digital surface 1252 of the digital tooth 1284. In some embodiments, segmentation can be initiated as soon as both the facial region 1202 and the lingual region 1222 are selected on the digital tooth 1204, for example. In some embodiments, selection of the facial and lingual regions can be performed by a user using an input device and viewing the digital model a display, for example. In some embodiments, the user can segment one or more digital teeth in a digital model. In some embodiments, the user can first select the facial region (or the lingual region) on the one or more digital teeth and then select the other region (lingual region or facial region) on the one or more digital teeth. In some embodiments, the user can select the facial region and lingual region per digital tooth, and repeat the process to segment multiple digital teeth.

In some embodiments the computer-implemented method can display a digital model on a display and receive input from an input device such as a mouse or touch screen on the display for example. For example, the computer-implemented method can receive a selected facial region and a lingual region. The computer-implemented method can optionally receive a selected occlusal direction in some embodiments, for example. The computer-implemented method can, upon receiving a segmentation initiation command, perform segmentation using one or more features described in the present disclosure. The computer-implemented method can, upon receiving manipulation commands, rotate, zoom, move, and/or otherwise manipulate the digital model in any way as is known in the art. The digital tooth can contain one or more tunnels.

As illustrated in FIG. 9, another example can include a system for segmenting a digital tooth in a 3D digital model of dentition, that includes: a processor 14030, a computer-readable storage medium 14034 that includes instructions executable by the processor 14030 to perform steps including: receiving a facial region and a lingual region of a digital tooth in a digital model, determining a separation region oriented through the facial region and the lingual region, determining a first segment path along the digital tooth on a first side of the separation region and determining a second segment path along the digital tooth on a second side of the separation region. In some embodiments, the separation region can be oriented through a facial point in the facial region and a lingual point in the lingual region, for example. The system can further optionally include providing one or more segmented digital teeth 14040 from the first segment path and the second segment path. The separation region can be oriented along an occlusal direction. The digital tooth can contain one or more tunnels.

Another example includes a non-transitory computer readable medium 14034 storing executable computer program instructions for segmenting a digital tooth in a 3D digital model of dentition, the computer program instructions including instructions for: receiving a facial region and a lingual region of a digital tooth in a digital model, determining a separation region oriented through the facial region and the lingual region, determining a first segment path along the digital tooth on a first side of the separation region, determining a second segment path along the digital tooth on a second side of the separation region, and providing a segmented digital tooth from the first segment path and the second segment path. In some embodiments, the separation region can be oriented through a facial point in the facial region and a lingual point in the lingual region, for example.

In view of the many possible embodiments to which the principles of the disclosure may be applied, it should be recognized that the illustrated embodiments are only examples and should not be taken as limiting the scope of the disclosure.

What is claimed is:

1. A computer-implemented method of segmenting a digital tooth in a 3D digital model of dentition, comprising:
   receiving a facial region and a lingual region of a digital tooth in a digital model;
   determining a separation region oriented through the facial region and the lingual region;
   determining a first segment path along the digital tooth on a first side of the separation region; and
   determining a second segment path along the digital tooth on a second side of the separation region,
   wherein the first segment path and the second segment path are determined by extending from a facial triangle edge and a lingual triangle edge along digital surface triangle edges,
   wherein the facial region comprises a facial point and the lingual region comprises a lingual point,
   wherein the facial triangle edge is a closest triangle edge to the facial point and the lingual triangle edge is a closest triangle edge to the lingual point.

2. The method of claim 1, wherein the separation region is oriented along an occlusal direction.

3. The method of claim 1, further comprising providing a segmented digital tooth from the first segment path and the second segment path.

4. The method of claim 3, wherein the segmented digital tooth comprises one or more tunnels.

5. The method of claim 1, wherein the facial region and the lingual region are selected by a user.

6. The method of claim 1, wherein the first segment path comprises a shortest path between the facial point and the lingual point along a digital surface of the first side.

7. The method of claim 6, wherein the second segment path comprises a shortest path between the facial point and the lingual point along a digital surface of the second side.

8. The method of claim 1, wherein the separation region is a plane.

9. The method of claim 1, wherein the first and second segment path comprise a boundary loop.

10. The method of claim 9, further comprising determining a digital surface of the digital tooth between the first segment path and the second segment path.

11. A computer-implemented method of segmenting a digital tooth in a 3D digital model of dentition, comprising:
    selecting a facial region and a lingual region of a digital tooth in a digital model; and
    initiating segmentation of the digital tooth,
    wherein segmentation comprises:
    determining a separation region oriented through the facial region and the lingual region;
    determining a first segment path along the digital tooth on a first side of the separation region; and
    determining a second segment path along the digital tooth on a second side of the separation region,
    wherein the first segment path and the second segment path are determined by extending from a facial triangle edge and a lingual triangle edge along digital surface triangle edges,
    wherein the facial region comprises a facial point and the lingual region comprises a lingual point,
    wherein the facial triangle edge is a closest triangle edge to the facial point and the lingual triangle edge is a closest triangle edge to the lingual point.

12. The method of claim 11, further comprising providing a segmented digital tooth from the first segment path and the second segment path.

13. The method of claim 11, wherein the first segment path comprises a shortest path between the facial point and the lingual point along a digital surface of the first side.

14. The method of claim 13, wherein the second segment path comprises a shortest path between the facial point and the lingual point along a digital surface of the second side.

15. The method of claim 13, wherein the facial point and the lingual point are along a gum line of the digital model.

16. The method of claim 11, wherein the separation region is a plane.

17. The method of claim 11, wherein the first segment path connects to the second segment path at the facial point and the lingual point.

18. The method of claim 11, wherein the first and second segment comprise a boundary loop.

19. The method of claim 11, further comprising determining a digital surface of the digital tooth between the first segment path and the second segment path.

20. A system for segmenting a digital tooth in a 3D digital model of dentition, comprising:
    a processor;
    a computer-readable storage medium comprising instructions executable by the processor to perform steps comprising:
    receiving a facial region and a lingual region of a digital tooth in a digital model;
    determining a separation region oriented through the facial region and the lingual region;
    determining a first segment path along the digital tooth on a first side of the separation region; and
    determining a second segment path along the digital tooth on a second side of the separation region,
    wherein the first segment path and the second segment path are determined by extending from a facial triangle edge and a lingual triangle edge along digital surface triangle edges,
    wherein the facial region comprises a facial point and the lingual region comprises a lingual point,
    wherein the facial triangle edge is a closest triangle edge to the facial point and the lingual triangle edge is a closest triangle edge to the lingual point.

21. The system of claim 20, further comprising providing a segmented digital tooth from the first segment path and the second segment path.

22. The system of claim 20, wherein the separation region is oriented along an occlusal direction.

23. A non-transitory computer readable medium storing executable computer program instructions for segmenting a digital tooth in a 3D digital model of dentition, the computer program instructions including instructions for:
    receiving a facial region and a lingual region of a digital tooth in a digital model;
    determining a separation region oriented through a facial point in the facial region and through a lingual point in the lingual region;
    determining a first segment path along the digital tooth on a first side of the separation region;
    determining a second segment path along the digital tooth on a second side of the separation region; and
    providing a segmented digital tooth from the first segment path and the second segment path, wherein the first segment path and the second segment path are determined by extending from a facial triangle edge and a lingual triangle edge along digital surface triangle edges, wherein the facial region comprises a facial point and the lingual region comprises a lingual point, wherein the facial triangle edge is a closest triangle edge to the facial point and the lingual triangle edge is a closest triangle edge to the lingual point.

\* \* \* \* \*